United States Patent [19]

Ehringer et al.

[11] Patent Number: 5,229,748
[45] Date of Patent: Jul. 20, 1993

[54] MONITORING SYSTEM FOR MONITORING THE WINDOW PANES OF AN INTERIOR, FOR EXAMPLE A MOTOR VEHICLE INTERIOR

[75] Inventors: Helmut Ehringer, Deuerling; Jürgen Schweiger; Norbert Müller, both of Regensburg, all of Fed. Rep. of Germany

[73] Assignee: Siemens Aktiengesellschaft, Munich, Fed. Rep. of Germany

[21] Appl. No.: 777,642

[22] Filed: Oct. 15, 1991

[30] Foreign Application Priority Data

Apr. 12, 1989 [DE] Fed. Rep. of Germany ....... 3912025
Mar. 13, 1990 [DE] Fed. Rep. of Germany ....... 9003065

[51] Int. Cl.$^5$ ...................... G08B 13/00; B60R 25/10
[52] U.S. Cl. ..................... 340/566; 340/426; 367/93; 367/906
[58] Field of Search ............... 340/566, 545, 544, 426, 340/429; 367/93-94, 906; 342/27; 381/159, 86

[56] References Cited

U.S. PATENT DOCUMENTS

| 2,833,999 | 5/1958 | Howry | 367/157 |
| 3,833,825 | 9/1974 | Haan | 310/320 |
| 4,134,109 | 1/1979 | McCormick et al. | 340/550 |
| 4,395,652 | 7/1983 | Nakanishi et al. | 310/334 |
| 4,597,099 | 6/1986 | Sawafuji | 381/90 |
| 4,665,379 | 5/1987 | Howell et al. | 340/426 |
| 4,837,558 | 6/1989 | Abel et al. | 340/550 |
| 4,853,677 | 8/1989 | Yarbrough et al. | 340/544 |

FOREIGN PATENT DOCUMENTS

| 0037620 | 10/1981 | European Pat. Off. . |
| 0075302 | 3/1983 | European Pat. Off. . |
| 0113512 | 7/1984 | European Pat. Off. . |
| 0308899 | 3/1989 | European Pat. Off. . |
| 1929472 | 12/1970 | Fed. Rep. of Germany . |
| 2855143 | 3/1980 | Fed. Rep. of Germany . |
| 3504552 | 8/1986 | Fed. Rep. of Germany . |
| 2293844 | 7/1976 | France . |
| 1402530 | 8/1975 | United Kingdom . |
| 9012379 | 10/1990 | World Int. Prop. O. .......... 340/566 |

Primary Examiner—Thomas Mullen
Attorney, Agent, or Firm—Herbert L. Lerner; Laurence A. Greenberg

[57] ABSTRACT

A monitoring system for monitoring window panes of an interior of a space or chamber having a plurality of window panes and lateral and/or upper and/or lower walls surrounding the window panes, such as an interior of a motor vehicle to be monitored for intruders, includes at least one microphone configuration for detecting vibrations typically produced when a pane is broken. The microphone configuration is fastened in the interior and/or to at least one of the walls of the space in each case without mechanical contact with the window panes to be monitored, in such a way that the respective microphone configuration can receive essentially only the vibrations transmitted by the air in the interior. The number of the microphone configurations used to detect acoustic vibrations typically produced when a pane is broken and transmitted by the air in the interior is less than the number of window panes and/or door panes and/or roof panes to be monitored for pane breakage.

11 Claims, 2 Drawing Sheets

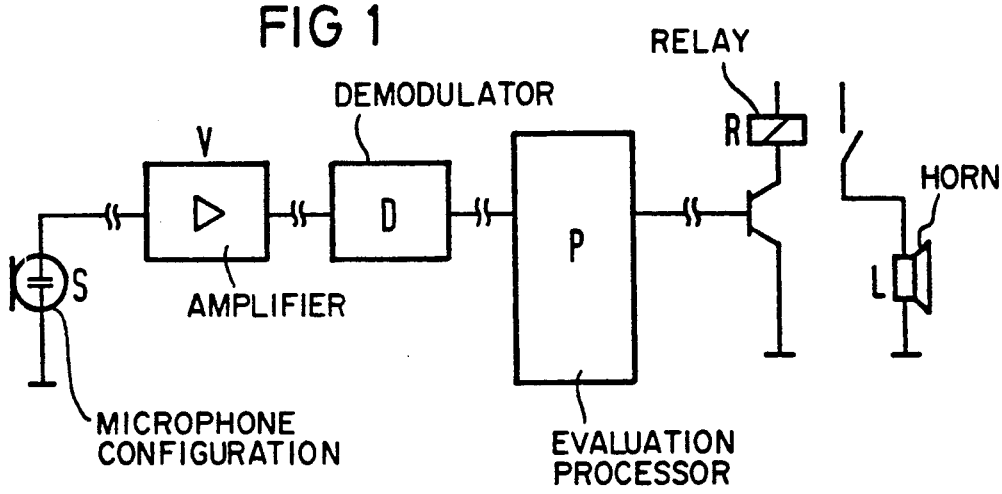

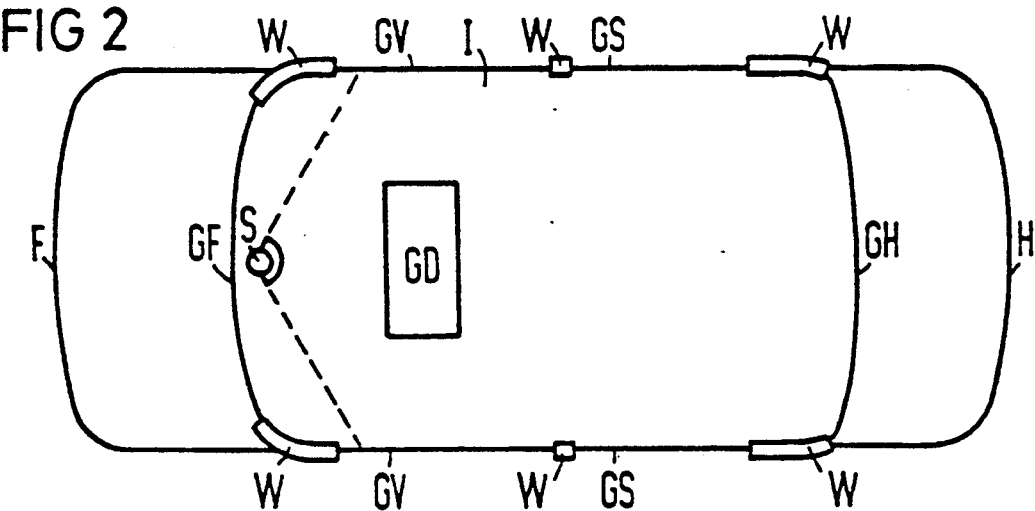
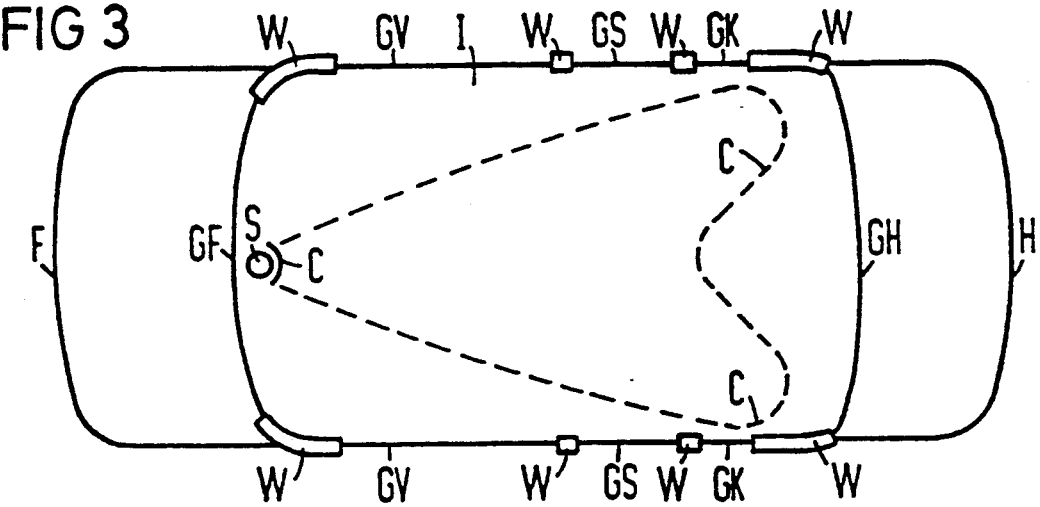
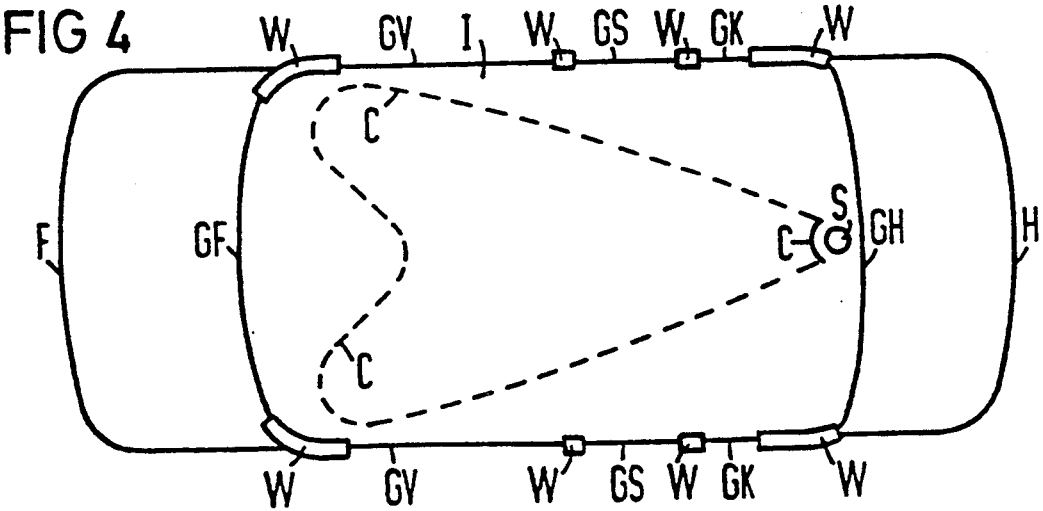

MONITORING SYSTEM FOR MONITORING THE WINDOW PANES OF AN INTERIOR, FOR EXAMPLE A MOTOR VEHICLE INTERIOR

CROSS-REFERENCE TO RELATED APPLICATION

This application is a Continuation of International Application PCT/DE90/00274, filed Apr. 6, 1990.

BACKGROUND OF THE INVENTION

Field of the Invention

The invention relates to a monitoring system for monitoring the window panes of an interior having a plurality of window panes and lateral and/or upper and/or lower walls surrounding the window panes, by means of a microphone configuration, in which the microphone configuration in each case can receive the sonic vibrations typically produced in the ultrasonic range above 100 kHz when a pane is broken, for example for monitoring a motor vehicle interior for intruders.

The invention was in fact developed for the monitoring of a motor vehicle interior, and more specifically for the monitoring of the window panes of a motor vehicle for pane breakage. The invention is not only suitable for monitoring the interior of a motor vehicle or other vehicles by monitoring the window panes, but it is also suitable for monitoring the window panes of fixed property, for example the window panes of warehouses.

The monitoring system initially defined above is known, for example, from British Patent No. 1 402 530, and in particular from FIG. 1 thereof, together with the associated description. In that system the structure-borne sonic vibrations produced in the monitored window panes are monitored above 100 kHz and up to several hundred kHz, by fastening one corresponding piezoceramic sensor on each of the window panes to be monitored. In other words, numerous correspondingly suitable microphone configurations are fastened for each interior, as described, for example, on page 2, left column, last paragraph of the British patent.

In that frequency range, structure-borne sonic vibrations in particular propagate through the window panes very well, whereas sonic vibrations can propagate in the air only with considerable damping in such an ultrasonic range. Accordingly, that known monitoring system is very insensitive to disturbances caused by air-borne sonic vibrations in such a frequency range if the air-borne sound comes from sound sources outside the space.

In fact, the invention also uses sound frequencies above 100 kHz for interior monitoring, as a result of which the monitoring system according to the invention is likewise very insensitive to air-borne sound in that frequency range if the disturbing source of the air-borne sound is outside the monitored space. However, the invention does not use the measurement of the structure-borne sound propagating in the window panes that is produced when a pane is broken. The invention thus also avoids the disadvantage of such prior art wherein a high outlay is required, namely in each case one sensor for each window pane to be monitored together with the wiring and the associated evaluation means therefor, and the frequently additional disadvantage that it is sometimes difficult, if not impossible, to detect as pane breakage a relatively small breakage of the window pane which is remote from the point at which the sensor touches the window pane.

In addition, it is known from U.S. Pat. No. 4,665,379 to monitor the various window panes of a motor vehicle interior by means of a single microphone configuration, wherein the microphone configuration is fastened in the motor vehicle interior or to its walls measuring the air-borne sonic vibrations in the frequency range from 5 kHz to around 8 kHz. The air-borne vibrations propagate in the air in the interior in that frequency range virtually without damping. Although the outlay for microphones and wiring is correspondingly low with such a monitoring system, the outlay for eliminating the disturbances caused by sources of air-borne sound outside the motor vehicle interior is correspondingly increased.

Furthermore, for monitoring an interior, it is known from German Published, Non-Prosecuted Application DE 35 04 552 A1 to measure the air-borne sound by means of a microphone configuration at two ultrasonic frequencies, namely at 40 kHz and at 50 kHz or, in accordance with the figure in that reference, to measure a relatively narrow band of one of the two frequencies by means of a bandpass filter on one hand, and the entire frequency range from ZERO up to the other of the two ultrasonic frequencies by means of a low-pass filter on the other hand. Up to such frequencies, the air namely still transmits the respective vibrations quite well. However, in that case, the sound sources radiating outside the space can then still represent considerable interference since not all of their sound is reflected outward at the outer surface of the space.

In addition, series of in-house experiments have shown that crafty intruders can easily damp the sonic vibrations produced in the window panes, primarily in the frequency range up to 50 kHz, but also well above it. However, the object of the invention was to provide a system with which the intruder could no longer successfully employ such damping measures. It was not the intention of the invention to rely on such a measurement of the ultrasonic vibrations.

It is well-known to the person skilled in the art how to form the directional characteristic of a microphone configuration, even for ultrasound, in accordance with a particular special requirement. For example, reference is made to:

U.S. Pat. No. 2,833,999,
U.S. Pat. No. 3,833,825,
U.S. Pat. No. 4,395,652,
U.S. Pat. No. 4,597,099,
Published European Application No. 0 037 620 A1,
Published European Application No. 0 075 302 A1,
Published European Application No. 0 308 899 A2,
French Patent No. 2 293 844, and
German Published, Prosecuted Application DE-AS 28 55 143.

The invention thus relates to the monitoring of an interior, wherein, as in the case of the monitoring system described in British Patent No. 1 402 530, the sonic vibrations triggered by a pane breakage are measured above 100 kHz, such sonic vibrations being propagated very well in many materials such as in glass, but only poorly in the air.

It is accordingly an object of the invention to provide a monitoring system for monitoring the window panes of a space, for example a motor vehicle interior, which overcomes the hereinafore-mentioned disadvantages of the heretofore-known devices of this general type.

The invention achieves the object:

of being able to simultaneously monitor numerous window panes of the interior for pane breakage in the frequency range above 100 kHz with approximately an equally high degree of reliability, with a particularly low outlay, especially with a single microphone configuration, even if the number of window panes it has to monitor is very high and some of the window panes to be monitored are in the vicinity of the sensor and others are very far away from it, of being able to simultaneously avoid by and large interfering influences due to foreign noises from the environment by the employment of these high frequencies, and also of being able to by and large avoid the erroneous non-detection of pane breakages since, as in-house experiments on motor vehicle window panes have shown, an intentional pane breakage is still all too frequently undetected if only the frequencies below 100 kHz are utilized as soon as an intruder damps the ability of the breaking window pane to vibrate by some means or other, which is an aspect that also precludes the measurement of the structure-borne sound then propagating in the window pane.

With the foregoing and other objects in view there is provided, in accordance with the invention, in an interior having a plurality of window panes and lateral and/or upper and/or lower walls surrounding the window panes, a monitoring system for monitoring the window panes, for instance in a motor vehicle interior, comprising a single microphone configuration fastened in the interior and/or to at least one of the walls of the interior, for receiving sonic vibrations typically produced in the ultrasonic range above 100 kHz when a pane is broken, the single microphone configuration monitoring essentially only the sonic vibrations transmitted by air in the interior with considerable damping in the ultrasonic range above 100 kHz, and the microphone configuration having a directional characteristic being matched to the geometry of the monitored interior and allowing the reception of the sonic vibrations received in the case of a breakage of remote pane areas to be monitored, at least as a rule with high sensitivity similar to the sonic vibrations being received in the case of a breakage of proximate pane areas to be monitored.

The invention is moreover suitable for additionally employing the sensor for other interior monitoring methods, which possibly even utilize quite a different frequency range of the received vibrations: the invention namely allows the microphone configuration to be additionally used as, for example, a receiving element of an acoustic radar system, instead of just as an element for detecting pane breakage. The invention then additionally allows the detection of suspicious movements in the space, to be precise, and likewise with a particularly low outlay, and even with a low outlay for the microphone configuration.

With the invention it is above all possible to secure all the glass areas of a motor vehicle with the single microphone configuration, as will be explained below. Therefore, in comparison to the known monitoring systems, through the use of the invention the ultrasonic frequencies above 100 kHz transmitted by the air in the interior are evaluated. In this case, with the invention the distance between the microphone configuration and the glass areas to be monitored may even be several meters.

In accordance with another feature of the invention, the interior is an interior of a motor vehicle to be monitored having a longitudinal axis, and the microphone configuration is attached approximately above the longitudinal axis of the motor vehicle and has a more or less heart-shaped directional characteristic. This feature allows the employment in a motor vehicle of a mirror-symmetrical directional characteristic which is particularly easy to produce, that is to say, for example, a microphone configuration having a directional characteristic forming two slightly overlapping lobes in a manner which is particularly easy to produce.

In accordance with a further feature of the invention, the interior is an interior of a motor vehicle having a windshield with an upper edge in the vicinity of which the microphone configuration is attached. In this way, a particularly favorable solution for a motor vehicle is offered, with which it is readily possible to avoid obstacles, for example headrests, between the sensor and the window panes to be monitored. In addition, it is much more difficult for an intruder to destroy the window pane and the sensor simultaneously than if the sensor were attached to the lower edge of the window pane. Moreover, the sensor can then even be built into the base of the interior rear-view mirror, or else into interior illumination means attached at that location, and therefore permit a particularly unobtrusive solution with a particularly attractive construction.

In accordance with an added feature of the invention, the interior is an interior of a motor vehicle having a rear window with an upper edge in the vicinity of which the microphone configuration is attached. This feature allows another favorable solution for a motor vehicle to be offered, with which the sensor can also be attached quite unobtrusively in the roof covering at that location and with which it is likewise readily possible to avoid obstacles, for example headrests, between the sensor and the window panes to be monitored. In addition it is much more difficult for an intruder to destroy the window pane and the sensor simultaneously than if the sensor were attached to the lower edge of the window pane.

In accordance with an additional feature of the invention, the microphone configuration at least from time to time is a microphone configuration of an acoustic radar system in a suitable frequency range, being able to deviate from a frequency range used for monitoring pane breakage.

In accordance with a concomitant feature of the invention, the radar system additionally utilizes the Doppler effect.

These features allow the microphone configuration to be utilized as a receiving element of an acoustic radar too.

Other features which are considered as characteristic for the invention are set forth in the appended claims.

Although the invention is illustrated and described herein as embodied in a monitoring system for monitoring the window panes of a space, for example a motor vehicle interior, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic and block diagram illustrating an example of a circuit which can evaluate vibrations received by a sensor;

FIG. 2 is a diagrammatic, top-plan view illustrating an example of monitoring various window panes of a motor vehicle with a single sensor, that is to say with a particularly low outlay; and FIGS. 3 and 4 are views similar to FIG. 2 illustrating examples of monitoring the various window panes of a motor vehicle likewise using a single sensor, but one which has a selected directional characteristic in this case.

DETAILED DESCRIPTION OF THE PREFERRED EMBODIMENTS

Referring now to the figures of the drawing in detail and first, particularly, to FIGS. 2–4 thereof, in each case there is seen a motor vehicle with a front F and a rear H.

If a window pane is smashed in a monitored space or chamber, that is to say in a monitored motor vehicle for example, sonic waves are consequently produced in the space, not only in the audible, but also in the inaudible range, and namely in the ultrasonic range.

In each case the examples illustrate the disposition according to the invention of a microphone configuration S in a motor vehicle interior I, having window panes to be monitored which are a windshield GF, door window panes GV, GS and rear window panes GH in FIGS. 2 to 4, as well as a glass roof opening GD in FIG. 2, and furthermore small, rear side window panes GK in FIGS. 3 and 4. Therefore, in the illustrated motor vehicle example there is a space I having a plurality of window panes which are all to be monitored jointly for pane breakage, in this case always by only a single microphone configuration S. Walls W which surround these window panes as is also indicated in the figures, in turn therefore represent lateral and/or upper and/or lower walls or surfaces W of the motor vehicle interior I. The microphone configuration S thus jointly monitors all of the window panes of the motor vehicle for breakage, that is to say for destruction, for example by an intruder.

The microphone configuration S can detect the vibrations typically produced when a pane is broken, for example ultrasonic vibrations that are typical of such an occurrence. While keeping in mind that according to the invention a plurality of microphone configurations S may also be attached in the illustrated motor vehicle, it is noted that the microphone configuration S is fastened in the interior I and/or to at least one of the walls W of the space I in each case without mechanical contact with the window panes GF, GV, GS, GK, GH, GD to be monitored, in such a way that in each case the respective microphone configuration S can essentially only receive the vibrations transmitted by the air in the interior. The microphone configuration S thus does not touch the window panes to be monitored, but above all reacts to the sonic waves produced by the window panes and transmitted by the air in the interior when a pane is broken.

According to the invention, in the illustrated examples the number of these microphone configurations S, which is only a single microphone configuration in FIGS. 2 to 4, that can detect acoustic vibrations typically produced when a pane is broken and transmitted by the air in the interior I, is less than the number of window panes GF, GV, GS, GK, GH, GD of the respective space I to be monitored for pane breakage, that is to say in the illustrated examples it is less than the number of windows GF, GV, GS, GK, GH, GD to be monitored for pane breakage. The outlay with the invention is therefore particularly low.

The invention thus avoids the disadvantage of the prior art of requiring a high outlay, namely one microphone configuration for each window pane to be monitored together with the wiring therefor in each case. Moreover, the invention avoids a disadvantage of it being frequently difficult, if not impossible, in the prior art, for example due to the different transmission paths on the window pane from the breakage to the microphone configuration, for a relatively small breakage of a window pane to be detected as pane breakage if the breakage is remote from the point at which the microphone configuration touches the window pane in the prior art. Above all the invention makes it possible to avoid a situation in which an intruder artificially damps the transmission path of the sound in the window pane from the breakage to the microphone configuration touching the window pane, for example by laying adhesive films which damp the sound propagation on the window pane before breaking it. Indeed, according to the invention the sound propagation in the air in the interior is utilized for detecting the pane breakage, with the typical sound frequencies that are virtually always produced when a pane is broken being utilized for the detection of pane breakage.

In addition, the invention even allows the desired monitoring to be achieved with a particularly low outlay, namely with fewer microphone configurations than there are window panes to be monitored. This makes a substantial saving for the cabling of the microphone configurations additionally possible with the invention.

Therefore, for example, in the illustrated examples, in order to detect breakage of a glass pane according to the invention, one or even more, narrow or even wide, bandwidths of the ultrasonic frequencies typically produced when a pane is broken are picked up by one or more microphone configuration and converted into electrical signals. In principle, the microphone configuration or the microphone configurations can even be fastened in this case at arbitrary locations in the vehicle interior. It is frequently particularly favorable in this case to provide a fastening in such a way that the sound can proceed from the breaking window panes directly to the microphone configuration instead of around obstacles. However, a distribution of the microphone configurations in the vicinity of the glass panes is not absolutely necessary, since it is in fact the air that is employed as the transmission medium for the (ultra)sonic waves.

As is shown in FIG. 1, it is possible, for example, for the (ultrasonic) microphone configuration S to be connected to a sufficiently amplifying amplifier V which is disposed downstream and has a suitable bandpass characteristic or, for example, with an additional bandpass filter connected downstream, and possibly also a demodulator D with an RC element for generating an envelope curve of the received signals, as well as an evaluation microprocessor P containing an A/D converter. For example, the microprocessor may in turn control a relay R for triggering an alarm by means of a horn L and/or, to be on the safe side, it can also interrupt the ignition, the starter or the like of the motor-vehicle when a pane is broken. In particular, an evaluation of the signals obtained in this way according to amplitude, time and frequency by means of the processor P, increases the reliability of the monitoring of the glass areas and therefore of the space.

Interfering influences can be relatively easily suppressed or avoided with the invention: foreign noises in the ultrasonic range from the environment, in this case from the environment of the motor vehicle, are greatly deadened by the glass panes and thus have a corresponding signal distance from the useful signal to be received from the microphone configuration, especially if a corresponding level evaluation is performed by means of the processor P. In addition, the reliability of the monitoring system can be further increased by an evaluation of the receive signal received by the microphone configuration separately according to amplitude, time and frequency.

It is thus advantageous with the invention that the cabling outlay, in this case in the motor vehicle, is also low, because the type and the location for the installation of the microphone configuration are largely optional. In addition, in principle it is even possible to monitor all of the window panes, in this case in the motor vehicle, with just a single microphone configuration. The system is thus particularly simple and therefore inexpensive, and is moreover reliable to a large degree.

As mentioned, the microphone configuration S of the illustrated pane breakage monitoring system can also be utilized in a number of ways, even for the illustrated motor vehicle examples, to be precise. A microphone configuration S, which is formed by a microphone, for example, can namely additionally be operated as a receiving element, that is to say as a component of an acoustic radar system, that is to say, for example, as a receiving element of a Doppler effect radar system or of a pulse echo system, without utilization of the Doppler effect, which also improves the security of the space.

It can also be seen from the above explanations of the illustrated examples that the outlay is particularly low, which above all is also because all of the window panes of the space to be monitored can at least in principle even be monitored with just a single microphone configuration.

In addition, it can already be seen from the explanations that the typical, particularly high frequencies of the sound produced when a pane is broken can be utilized if the respective microphone configuration monitors vibrations that are typical of pane breakage in the ultrasonic range.

Moreover, an advantage of a further development of the invention is the fact that by and large it is possible to avoid the erroneous non-detection of pane breakages if the microphone configuration S monitors acoustic vibrations above 100 kHz. Namely, as experiments above all on motor vehicle window panes have shown, pane breakages are still all too frequently undetected if only the frequencies below 100 kHz are utilized, especially if an intruder damps the ability of the breaking window pane to vibrate by some means or other.

If at least one microphone configuration having a directional characteristic C, that is to say one having different sensitivities depending on direction, is employed in the monitoring system according to the invention, and if in this case the microphone configuration has such a directional characteristic C shown in FIGS. 3 and 4, that the microphone configuration S can receive the acoustic vibrations to be monitored by it, which are produced by a breakage of remote pane areas to be monitored by it, despite the often considerable damping of the sound energy by the transmitting air in the case of high ultrasonic frequencies, at around 100 kHz for example, at least as a rule with a high sensitivity similar to the acoustic vibrations to be monitored by it, which are produced by a breakage of proximate pane areas to be monitored by it if, that is, the lobe(s) of the directional characteristic C are directed onto the remote window panes because a sound produced by these window panes is damped more in the air in the interior than the sound produced by a proximate window pane, then not only is a single microphone configuration sufficient, but it is nevertheless possible to achieve approximately an equally high degree of reliability of the monitoring system for all window panes of the space to be monitored, even if the number of window panes to be monitored is very high and if in addition some of the window panes to be monitored are in the vicinity of the microphone configuration and others are very far away from the microphone configuration.

If, in a motor vehicle monitoring system according to the invention, the respective microphone configuration is attached in the vicinity of the upper edge of the windshield GF, a particularly favorable solution for a motor vehicle can be achieved: it is then readily possible to avoid obstacles, for example headrests, between the microphone configuration and the window panes to be monitored. In addition it is much more difficult for an intruder to destroy the window pane and the microphone configuration simultaneously than if the microphone configuration were attached to the lower edge of the window pane. Moreover, the microphone configuration can then even be built into the base of the interior rear-view mirror, or else into interior illumination means attached at that location, and therefore permit a particularly unobtrusive solution with a particularly attractive construction.

However, if the respective microphone configuration is attached in the vicinity of the upper edge of the rear window GH in a motor vehicle monitoring system according to the invention, a favorable solution for a motor vehicle can likewise be achieved: the microphone configuration can then also be attached quite unobtrusively in the roof covering at that location, it then being likewise readily possible to avoid obstacles, for example headrests, between the microphone configuration and the window panes to be monitored. In addition, it is then much more difficult for an intruder to destroy the window pane and the microphone configuration simultaneously than if the microphone configuration were attached to the lower edge of this window pane.

If the respective microphone configuration, such as in FIGS. 3 and 4, is attached in each case in the middle of the upper edge of the respective window pane, such as the panes GF, GH, it is additionally possible to employ a microphone configuration having a mirror-symmetrical directional characteristic C which is easy to produce, that is to say, for example, a microphone configuration having a directional characteristic C according to FIGS. 3 and 4 which forms approximately two slightly overlapping lobes in a manner which is particularly easy to produce.

We claim:

1. In an interior defined by a plurality of window panes and at least one of lateral, upper and lower walls surrounding the window panes, a monitoring system for monitoring the window panes, comprising a single microphone configuration for receiving sonic vibrations typically produced and transmitted by air in the interior in the ultrasonic range above 100 kHz when a pane is broken, said microphone configuration being disposed in the interior at a location defining relatively proximate and relatively remote pane areas to be monitored, and said microphone configuration having a directional characteristic being matched to the geometry of the monitored interior and allowing the reception of the sonic vibrations produced in the case of a breakage of remote pane areas to be monitored, generally with a sensitivity similar to that of the reception of the sonic vibrations produced in the case of a breakage of proximate pane areas to be monitored.

2. The monitoring system according to claim 1, wherein said single microphone configuration is fastened in the interior and to at least one of the walls of the interior.

3. The monitoring system according to claim 1, wherein said single microphone configuration is fastened in the interior.

4. The monitoring system according to claim 1, wherein said single microphone configuration is fastened to at least one of the walls of the interior.

5. The monitoring system according to claim 1, wherein the interior is an interior of a motor vehicle to be monitored having a longitudinal axis, and said microphone configuration is attached in the interior approximately along the longitudinal axis of the motor vehicle and has a more or less heart-shaped directional characteristic.

6. The monitoring system according to claim 1, wherein the interior is an interior of a motor vehicle having a windshield with an upper edge in the vicinity of which said microphone configuration is attached.

7. The monitoring system according to claim 1, wherein the interior is an interior of a motor vehicle having a rear window with an upper edge in the vicinity of which said microphone configuration is attached.

8. The monitoring system according to claim 1, wherein said microphone configuration is additionally suitable for use in an acoustic radar system and for monitoring a radar frequency range.

9. The monitoring system according to claim 8, wherein said radar system additionally utilizes the Doppler effect.

10. In a motor vehicle interior defined by a plurality of window panes and at least one of lateral, upper and lower walls surrounding the window panes, a monitoring system for monitoring the window panes for intruders, comprising a single microphone configuration for receiving sonic vibrations typically produced and transmitted by air in the interior in the ultrasonic range above 100 kHz when a pane is broken, said microphone configuration being disposed in the interior at a location defining relatively proximate and relatively remote pane areas to be monitored, and said microphone configuration having a directional characteristic being matched to the geometry of the monitored interior and allowing the reception of the sonic vibrations produced in the case of a breakage of remote pane areas to be monitored, generally with a sensitivity similar to that of the reception of the sonic vibrations produced in the case of a breakage of proximate pane areas to be monitored.

11. A system for monitoring window panes in an interior, comprising a single microphone configuration for monitoring sonic vibrations typically produced in the ultrasonic range above 100 kHz and transmitted by air in the interior when a pane is broken and for receiving the sonic vibrations, and said microphone configuration being disposed in the interior at a location defining relatively proximate pane areas to be monitored and relatively remote pane areas to be monitored and having a directional characteristic being matched to the geometry of the monitored interior allowing the reception of the sonic vibrations produced in the case of a breakage of a window pane in a remote pane area, generally with similar sensitivity to that of the reception the sonic vibrations produced in the case of a breakage of a window pane in the proximate pane area.

* * * * *